United States Patent
Larko et al.

(10) Patent No.: US 9,916,585 B2
(45) Date of Patent: Mar. 13, 2018

(54) METHODS AND SYSTEMS FOR GENERATING A TRANSACTION LIFECYCLE OUTPUT FOR A PAYMENT CARD TRANSACTION

(71) Applicant: MasterCard International Incorporated, Purchase, NY (US)

(72) Inventors: John R Larko, Wildwood, MO (US); Norma J Lamm, Creve Coeur, MO (US); Bradford R Dillahunty, Wildwood, MO (US); Ted C Boehm, Lake St. Louis, MO (US); Amarnath Badrinarayan, Ballwin, MO (US)

(73) Assignee: MasterCard International Incorporated, Purchase, NY (US)

( * ) Notice: Subject to any disclaimer, the term of this patent is extended or adjusted under 35 U.S.C. 154(b) by 493 days.

(21) Appl. No.: 13/796,795

(22) Filed: Mar. 12, 2013

(65) Prior Publication Data
US 2014/0279500 A1    Sep. 18, 2014

(51) Int. Cl.
G06Q 20/00 (2012.01)
G06Q 20/22 (2012.01)
G06Q 30/00 (2012.01)

(52) U.S. Cl.
CPC ................... *G06Q 30/016* (2013.01)

(58) Field of Classification Search
USPC .................................................. 705/44, 36 R
See application file for complete search history.

(56) References Cited

U.S. PATENT DOCUMENTS

| | | | |
|---|---|---|---|
| 7,356,516 B2 | 4/2008 | Richey et al. | |
| 8,145,567 B2 | 3/2012 | Banaugh et al. | |
| 8,209,354 B1* | 6/2012 | Shmuylovich et al. | 707/799 |
| 2002/0179704 A1* | 12/2002 | Deaton | G06Q 20/204 |
| | | | 235/381 |
| 2008/0154783 A1 | 6/2008 | Rule et al. | |
| 2008/0195579 A1* | 8/2008 | Kennis et al. | 707/3 |
| 2009/0030710 A1 | 1/2009 | Levine | |
| 2009/0271322 A1* | 10/2009 | Lay | G06Q 20/0453 |
| | | | 705/75 |
| 2010/0169194 A1 | 7/2010 | Richey et al. | |
| 2012/0136782 A1 | 5/2012 | Norman et al. | |
| 2012/0284188 A1 | 11/2012 | Vasquez et al. | |
| 2013/0204785 A1* | 8/2013 | Monk et al. | 705/44 |

\* cited by examiner

*Primary Examiner* — Robert R Niquette
*Assistant Examiner* — Joseph W King
(74) *Attorney, Agent, or Firm* — Armstrong Teasdale LLP

(57) ABSTRACT

Systems and methods for generating a transaction lifecycle output using a transaction lifecycle (TL) computer system are provided herein. The TL computer system includes a memory device for storing data and a processor in communication with the memory device. The processor is programmed to receive transaction data associated with a transaction being processed over a payment network. The transaction data includes authorization data, clearing data, and fraud data. The processor is also programmed to generate the transaction lifecycle output by processing the authorization data, the clearing data, and the fraud data. The transaction lifecycle output includes output data organized by pre-defined stages of the transaction.

9 Claims, 9 Drawing Sheets

FIG. 8

```
                                                                           ┌─ 800
┌─────────────────────────────────────────────────────────────────────────┐
│ Debit Sender ⊗  ┌─┐                                                     │
│ Unworked        │+│                                                     │
│ ┌──────────────┴─┴────────────────┐            ┌◁ ▽ │1│ of 1 selected▷ ▷││
│ │Apply Action ▽││Manage Views▷│                                          │
│ ├──┬──┬─────────┬──────────────┬──────┬──────────────────┬───┐  ┌──────┐ │
│ │  │  │   ID    │   Primary    │Reason│    Acquirer      │Loc│  │Attach│ │
│ │  │  │         │Account Number│ Code │  Reference Data  │   │  └──────┘ │
│ ├──┼──┼─────────┼──────────────┼──────┼──────────────────┼───┤           │
│ │□ │○ │47904659 │5499888800000010│ 4834 │75405800259000000…│   │ Transaction  04-Jan 05-Jan 06-Jan 07-Jan 08-Jan 09-Jan 10-Jan
│ │□ │◉(2)│47904658│5499888800000010│ 4834 │75405800259000000…│   │ Details       Auth   Auth   Auth   Auth   1st    1st   Retri-  1st
│ │□ │◉(1)│47904657│5499888800000010│ 4834 │75405800259000000…│   │              Adv    Rev   Present Rev   eval  CB
│ │☒ │  │47904656 │5499888800000011│ 2011 │75100429341000000…│   │ ┌Transaction Details──────────────────────────────┐
│ │□ │  │47904639 │5499888800000010│ 4834 │75405800259000000…│   │ │Chargeback ID:          47904656                 │
│ │□ │◉(1)│47904638│5499888800000010│ 4834 │75405800259000000…│   │ │Chargeback Amount:      65.55                    │
│ │□ │  │47904637 │5499888800000011│ 2011 │75100429341000000…│   │ │Currency Code (Alpha):  USD    10,000.00         │
│ │□ │  │47904636 │5499888800000011│ 2011 │75100429341000000…│   │ │Account Number:         5488.8888.6321.0467      │
│ │□ │  │47904633 │5499888839999994│ 4834 │75440339140000000…│   │ │Acquirer Reference Data: 7531356100226621900553 │
│ │□ │  │47904632 │5499888839999995│ 4834 │75440339530000000…│   │ │Reason Code:            0000004466               │
│ └──┴──┴─────────┴──────────────┴──────┴──────────────────┴───┘   │Cycle (Function Code):  4855                     │
│ ◁│ Page │1│ of 29 ▽ ▷│      Displaying 1-25 of 674               │Chargeback Date:        17-FEB-2012              │
│                                                                   └─────────────────────────────────────────────────┘
└─────────────────────────────────────────────────────────────────────────┘
```

METHODS AND SYSTEMS FOR GENERATING A TRANSACTION LIFECYCLE OUTPUT FOR A PAYMENT CARD TRANSACTION

BACKGROUND OF THE DISCLOSURE

This invention relates generally to methods and systems for generating a transaction lifecycle for a payment transaction involving a payment card, and more specifically, to computer-implemented methods and systems for generating a transaction lifecycle for use in disputing a transaction.

Managing transaction card disputes is a manually-intensive process that requires precise and accurate management of supporting documents. High fees, complex rules, costly resources, and sizeable write-offs make the dispute management operation of any financial institution a resource-intensive and costly process. The economic and operational burden on retail banking operations can be substantial for a card issuer processing a dispute on behalf of a cardholder, and an acquiring bank on behalf of a merchant. Transaction data associated with different stages of the transaction is typically stored in separate databases operated by the payment card network used for processing the disputed transaction. During a dispute, issuers and acquirers often have to contact numerous services to obtain the transaction data for each of the different stages.

As the number of consumers using transaction cards and other electronic payment options increases, along with the increasing number of merchants accepting these types of payments, dispute transaction volumes have also grown. With such a growth in claim volume and an increasing availability of choices of payment products and services, an unresolved or mishandled dispute could drive a cardholder or merchant to take their business to a competitor, resulting in lost business.

BRIEF DESCRIPTION OF THE DISCLOSURE

In one embodiment, a transaction lifecycle (TL) computer system is provided for generating a transaction lifecycle output. The TL computer system includes a memory device for storing data and a processor in communication with the memory device. The processor is programmed to receive transaction data associated with a transaction being processed over a payment network. The transaction data includes authorization data, clearing data, and fraud data. The processor is also programmed to generate the transaction lifecycle output by processing the authorization data, the clearing data, and the fraud data. The transaction lifecycle output includes output data organized by pre-defined stages of the transaction.

In another embodiment, a computer-implemented method of generating a transaction lifecycle output for a transaction using a transaction lifecycle (TL) computer system is provided. The TL computer system includes a processor in communication a memory device. The method includes receiving, at the TL computer system, transaction data associated with the transaction processed over a payment network. The transaction data includes authorization data, clearing data, and fraud data. The method also includes generating the transaction lifecycle output by processing the authorization data, the clearing data, and the fraud data. The transaction lifecycle output includes output data organized by pre-defined stages of the transaction.

In yet another embodiment, one or more computer-readable storage media having computer-executable instructions embodied thereon are provided. When executed by at least one processor on a transaction lifecycle (TL) computer system, the computer-executable instructions cause the processor to receive transaction data associated with a transaction processed over a payment network. The transaction data includes authorization data, clearing data, and fraud data. The computer-executable instructions also cause the processor to generate a transaction lifecycle output by processing the authorization data, the clearing data, and the fraud data. The transaction lifecycle output includes output data organized by pre-defined stages of the transaction.

BRIEF DESCRIPTION OF THE DRAWINGS

FIGS. 1-9 show exemplary embodiments of the method and system described herein.

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example payment account card system having a transaction lifecycle computer system in accordance with one embodiment of the present invention.

FIG. 3 is an expanded block diagram of an example embodiment of a server architecture of a payment account card system having a transaction lifecycle computer system in accordance with one embodiment of the present invention.

FIG. 4 illustrates an example configuration of a client system as shown in FIGS. 2 and 3.

FIG. 5 illustrates an example configuration of a server system shown in FIGS. 2 and 3.

FIG. 6 is a data flow diagram showing a disputed transaction being processed on the transaction lifecycle computer system shown in FIG. 2.

FIG. 7 is a flow chart of an example method of generating a transaction lifecycle using the transaction lifecycle computer system shown in FIG. 2.

FIG. 8 is a screenshot of an example home screen generated by the transaction lifecycle computer system shown in FIG. 2.

FIG. 9 is a screenshot of an exemplary stage detail window generated by the transaction lifecycle computer system shown in FIG. 2.

DETAILED DESCRIPTION OF THE DISCLOSURE

Figure 1:
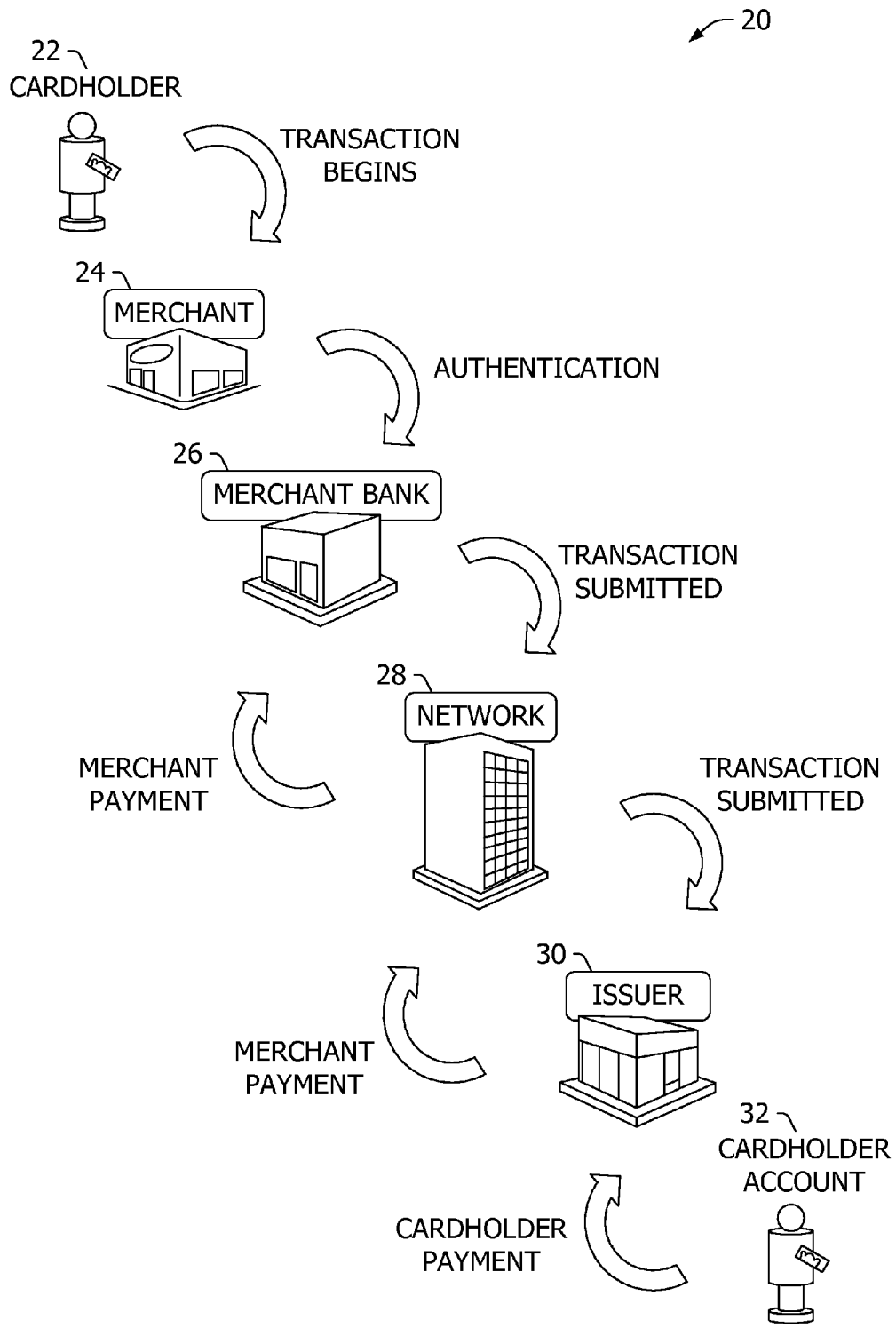

The following detailed description illustrates embodiments of the disclosure by way of example and not by way of limitation. The description clearly enables one skilled in the art to make and use the disclosure, and describes several embodiments, adaptations, variations, alternatives, and uses of the disclosure, including what is presently believed to be the best mode of carrying out the disclosure. The disclosure is described as applied to an example embodiment, namely, methods and systems for generating a transaction lifecycle for a payment transaction involving a payment card. More specifically, the disclosure describes a transaction lifecycle computer system (also referred to as "TL computer system") configured to collect transaction data associated with various stages of a payment transaction, process the collected data, and display the transaction data as a lifecycle transaction timeline to a user (e.g., an acquirer bank and/or issuer bank) involved in the disputing of the transaction via a dispute processing platform. The TL computer system is in communication with a user device having a dispute application stored thereon such that the user can view historical transaction data for transactions that are disputed by a merchant or a cardholder. When interfacing with the dispute processing platform, the user can select a disputed transaction to view a lifecycle summary for completed stages of the transaction, and view detailed data and records associated with each completed stage.

In the example embodiment, the TL computer system is configured to be in communication with or be a part of a payment card processing network such as, for example, an interchange network. The TL computer system includes a memory device and a processor in communication with the memory device, and is programmed to communicate with the payment network to receive transaction data for a plurality of transactions. The payment network is configured to process payment card transactions between the merchant and its acquirer bank, and the cardholder and their issuer bank. The payment network processes the transactions by generating authorization and clearing messages for each transaction, which are passed between the acquirer and the issuer through the payment network. Transaction information for the transaction is stored in a data warehouse associated with the payment network. The transaction information includes authorization data, clearing data, and fraud data, each of which is stored in a separate database within the data warehouse.

The payment network includes at least an authorization system, a clearing system, and a fraud detection system. The authorization system extracts authorization data from the authorization message and stores the authorization data in an authorization details database within the data warehouse. Authorization data includes a transaction identifier associated with the authorized transaction. The clearing system withdraws clearing data from the clearing message and stores the clearing data in a clearing details database within the data warehouse. Clearing data includes a transaction identifier associated with the cleared transaction. The fraud detection system analyzes distinctive variables for a plurality of transactions and may assign each transaction a fraud score based on the computed likelihood that a particular transaction is fraudulent. The fraud detection system may also include the fraud score in the authorization message, which is in turn stored in the authorization database. In addition, the fraud detection system stores the data from potentially fraudulent transactions in a fraud details database within the data warehouse. Fraud data includes a transaction identifier associated with the scored transaction. For example, as described herein, the term "fraud detection system" may refer to any system relating to gathering or generating fraud data for a payment transaction. A fraud detection system may include a system that provides detailed fraud data from issuers and/or cardholders including, for example, detailed fraud data from a system owned by MasterCard International Incorporated® (MasterCard is a registered trademark of MasterCard International Incorporated located in Purchase, N.Y.) called the SAFE System ("System to Avoid Fraud Effectively"), or a system that provides detailed fraud data from acquirers and/or merchants, for example, detailed fraud data from a system owned by MasterCard® called the MATCH™ System ("Member Alert to Control High-risk Merchants") (MATCH is a trademark of MasterCard International Incorporated located in Purchase, N.Y.).

The data warehouse also stores information related to other stages of transactions including dispute stages. Dispute stages include retrieval request, first chargeback, second presentment, arbitration chargeback, and case filing. During a dispute, the issuer and the acquirer communicate back and forth via the payment network to settle the dispute between the cardholder and the merchant.

A retrieval request is an initial step for a cardholder to dispute a transaction. The cardholder makes a retrieval request to their issuer, and the issuer requests a copy of the ticket or receipt of the original transaction from the acquirer. When a retrieval request occurs, retrieval data associated with the retrieval request is stored in the data warehouse. Retrieval data includes at least one of an acquirer identifier, an issuer identifier, an acquirer reference number, a transaction clearing date, and/or a message reason code.

A chargeback occurs when a cardholder disputes a transaction through their issuer. The issuer initiates a chargeback against the merchant's account with the acquirer through the payment network. When a chargeback occurs, chargeback data is stored in the data warehouse. The chargeback data includes at least one of an acquirer identifier, an issuer identifier, an original transaction amount, a chargeback amount, a chargeback date, an acquirer reference number, a chargeback identifier, and/or a chargeback reason code.

Second presentment occurs when the acquirer rejects the chargeback and provides additional proof or documentation that the disputed transaction was valid, such as, for example, a signed receipt or proof of delivery. When a second presentment occurs, second presentment data is stored in data warehouse 120 and includes at least one of an acquirer identifier, an issuer identifier, a transaction amount, a transaction currency code, an acquirer reference number, a transaction clearing date, a reversal indicator, and/or an exclusion indicator.

Arbitration chargeback occurs when a second presentment is rejected by an issuer. When arbitration chargeback occurs, a case filing is automatically generated with the payment network. When presented with a case filing, the payment network reviews the disputed transaction and issues a financial liability decision regarding the chargeback. When a case filing occurs, case filing data is stored in the data warehouse. Case filing data includes a case identifier, a case type, an analyst assigned to the case, a chargeback reason code, and/or a case status.

The payment network is in communication with the TL computer system that includes the dispute processing platform. The TL computer system is in communication with the payment network such that the TL computer system can access data in the data warehouse coupled to the payment network. More specifically, the TL computer system retrieves and analyzes authorization data from the authorization database, clearing data from the clearing details database, fraud data from the fraud details database, and any data related to dispute stages of a disputed transaction. By matching the transaction identifiers for transactions from each database, the TL computer system compiles all of the transaction data for the transaction and generates a lifecycle. The TL computer system makes the lifecycle and transaction data available to issuers and/or merchants via the dispute processing platform.

The dispute processing platform displays a list of disputed transactions associated with a particular user (i.e., acquirer or merchant) accessing the dispute processing platform. When the user selects a disputed transaction, the dispute processing platform displays the lifecycle timeline for the transaction including all transaction stages completed and a summary of the transaction details. The summary may include original transaction amount, issuer and/or acquirer reference numbers, transaction clearing date, and/or transaction identifier. Transaction stages include authorization, clearing and settlement (also referred to as first presentment), retrieval request, first chargeback, second presentment, arbitration chargeback, and case filing. When the user selects a particular stage from the timeline, the dispute processing platform displays detailed data for the stage. The detailed stage data varies depending on the stage selected by the user. Additionally, any records and/or documents associated with the stage are displayed in image form.

As used herein, the terms "data," "authorization data," "clearing data," "fraud data," "transaction data," and "transaction identifier" refer to any data that may be used to assist in identification of a transaction, such as the amount of sale, the geographic location of a sale, the cardholder's name, the cardholder's address, the cardholder account number, the bank network reference number, the 6-digit authorization code, an acquirer-assigned sequence number, and/or any other data that may be used to identify a transaction. Additionally, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effect may be achieved by performing at least one of the following steps: (a) receiving, at a Transaction Lifecycle computer system ("TL computer system"), transaction data associated with a transaction from a payment network, the transaction data including authorization data, clearing data, and fraud data; (b) storing the extracted transaction information in separate authorization, clearing, and fraud databases within a data warehouse; (c) receiving dispute stage data associated with the transaction, the dispute stage data including at least one of retrieval data, chargeback data, second presentment data, and case filing data; (d) generating a transaction lifecycle output by processing the authorization data, the clearing data, the fraud data, and the dispute stage data, wherein the transaction lifecycle output represents completed stages of the transaction; (e) accessing a dispute processing platform stored on the TL computer system by a user, the user using a dispute application stored on a user computer device; (f) viewing, by the user, a list of disputed transactions associated with the user; (g) when the user selects a particular disputed transaction, displaying the transaction lifecycle output for the selected transaction as a timeline including a plurality of landmarks representing each completed transaction stage; and (h) displaying detailed stage data when the user selects a particular stage from the timeline, the detailed stage data including at least one of transaction data and a recorded document for the stage.

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods of creating a transaction lifecycle output and labeling process wherein the transaction lifecycle output can be used to better recognize a fraudulent transaction in real time. However, it is contemplated that this disclosure has general application to computing systems in industrial, commercial, and residential applications.

FIG. 1 is a schematic diagram illustrating an exemplary multi-party payment card system 20 for enabling ordinary payment-by-card transactions in which merchants and card issuers do not necessarily have a one-to-one relationship. The present invention relates to payment card system 20, such as a credit card payment network using the MasterCard® payment card system interchange network 28. MasterCard® payment card system interchange network 28 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 20, a financial institution, such as an issuer 30, issues a payment account card, such as a credit card account or a debit card account, to a cardholder 22, who uses the payment account card to tender payment for a purchase from a merchant 24. To accept payment with the payment account card, merchant 24 must normally establish an account with a financial institution that is part of the financial payment network. This financial institution is usually called the "merchant bank" or the "acquiring bank" or "acquirer bank" or simply "acquirer. When a cardholder 22 tenders payment for a purchase with a payment account card (also known as a financial transaction card), merchant 24 requests authorization from acquirer 26 for the amount of the purchase. The request may be performed over the telephone, but is usually performed through the use of a point-of-sale terminal, which reads the cardholder's account information from the magnetic stripe on the payment account card and communicates electronically with the transaction processing computers of acquirer 26. Alternatively, acquirer 26 may authorize a third party to perform transaction processing on its behalf. In this case, the point-of-sale terminal will be configured to communicate with the third party. Such a third party is usually called a "merchant processor" or an "acquiring processor."

Using payment card system interchange network 28, the computers of acquirer 26 or the merchant processor will communicate with the computers of issuer 30 to determine whether the cardholder's account is in good standing and whether the purchase is covered by the cardholder's available credit line or account balance. Based on these determinations, the request for authorization will be declined or accepted. If the request is accepted, the transaction is given a bank network reference number, such as the Banknet Reference Number used by MasterCard International Incorporated®, an authorization code, and/or other transaction identifiers that may be used to identify the transaction.

During the authorization process of the payment card system, the clearing process is also taking place. During the clearing process, acquirer 26 provides issuer 30 with information relating to the sale. No money is exchanged during clearing. Clearing (also referred to as "first presentment") involves the exchange of data required to identify the cardholder's 22 account such as the account number, expiration date, billing address, amount of the sale, and/or other transaction identifiers that may be used to identify the transaction. Along with this data, banks in the United States also include a bank network reference number, such as the Banknet Reference Number used by MasterCard International Incorporated®, which identifies that specific transaction. In foreign countries, banks include a 6-digit authorization code to identify the transaction. These will be discussed in further detail below. When the issuing bank 30 receives this data, it posts the amount of sale as a draw against the cardholder's 22 available credit and prepares to send payment to the acquirer 26.

When a request for authorization is accepted, the available credit line or available account balance of cardholder's account 32 is decreased. Normally, a charge is not posted immediately to a cardholder's account 32 because bankcard associations, such as MasterCard International Incorporated®, have promulgated rules that do not allow a merchant to charge, or "capture," a transaction until goods are shipped or services are delivered. When a merchant 24 ships or delivers the goods or services, merchant 24 captures the transaction by, for example, appropriate data entry procedures on the point-of-sale terminal. If a cardholder 22 cancels a transaction before it is captured, a "void" is generated. If a cardholder 22 returns goods after the transaction has been captured, a "credit" is generated.

After a transaction is captured, the transaction is settled between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

In some instances, cardholder 22 disputes the transaction. A dispute may occur for technical reasons such as insufficient funds, clerical reasons such as duplicate billing and/or incorrect amount billed, quality reasons such as when a consumer claims to have never received the goods as promised, and/or fraud reasons where a consumer did not authorize the purchase. A dispute may be either a retrieval request or a chargeback.

A retrieval request may be made when cardholder 22 observes unrecognized charges on a statement. Cardholder 22 initiates a retrieval request to issuer 30 to obtain proof or documentation relating to the transaction. Issuer 30 requests proof or documentation from acquirer 26. Upon receipt, issuer 30 provides the documentation to cardholder 22. If cardholder 22 is satisfied with the documentation, no further action is taken. However, if cardholder 22 does not agree with the charge, cardholder 22 may initiate a chargeback of funds.

To initiate a chargeback, cardholder 22 contacts issuer 30 and disputes the transaction. Issuer 30 submits the chargeback transaction to interchange network 28, which provides clearing and settlement services to its members. Interchange network 28 submits the chargeback to acquiring bank 26. Acquiring bank 26 either resolves the dispute or forwards it to merchant 24. Merchant 24 either accepts the chargeback or re-presents it back to acquiring bank 26. If merchant 24 accepts the chargeback, acquirer 26 forwards the response back to interchange network 28. Interchange network 28 then settles the chargeback with issuer 30. If merchant 24 re-presents the chargeback, acquirer 26 rejects the chargeback requested by issuer 30, which is a stage referred to as second presentment. Acquirer 26 may provide additional proof or documentation that the transaction was valid. Based on the second presentment, issuer 30 either accepts it and takes no further action, or rejects the second presentment, which is a stage referred to as arbitration chargeback. Once arbitration chargeback occurs, neither issuer 30 nor acquirer 26 may initiate any additional chargebacks or presentments. At this point a case filing is automatically generated with interchange network 28, which issues a financial liability decision regarding the chargeback.

Financial transaction cards or payment account cards can refer to credit cards, debit cards, and prepaid cards. These cards can all be used as a method of payment for performing a transaction. As described herein, the term "financial transaction card" or "payment account card" includes cards such as credit cards, debit cards, and prepaid cards, but also includes any other devices that may hold payment account information, such as mobile phones, personal digital assistants (PDAs), and key fobs.

Figure 2:
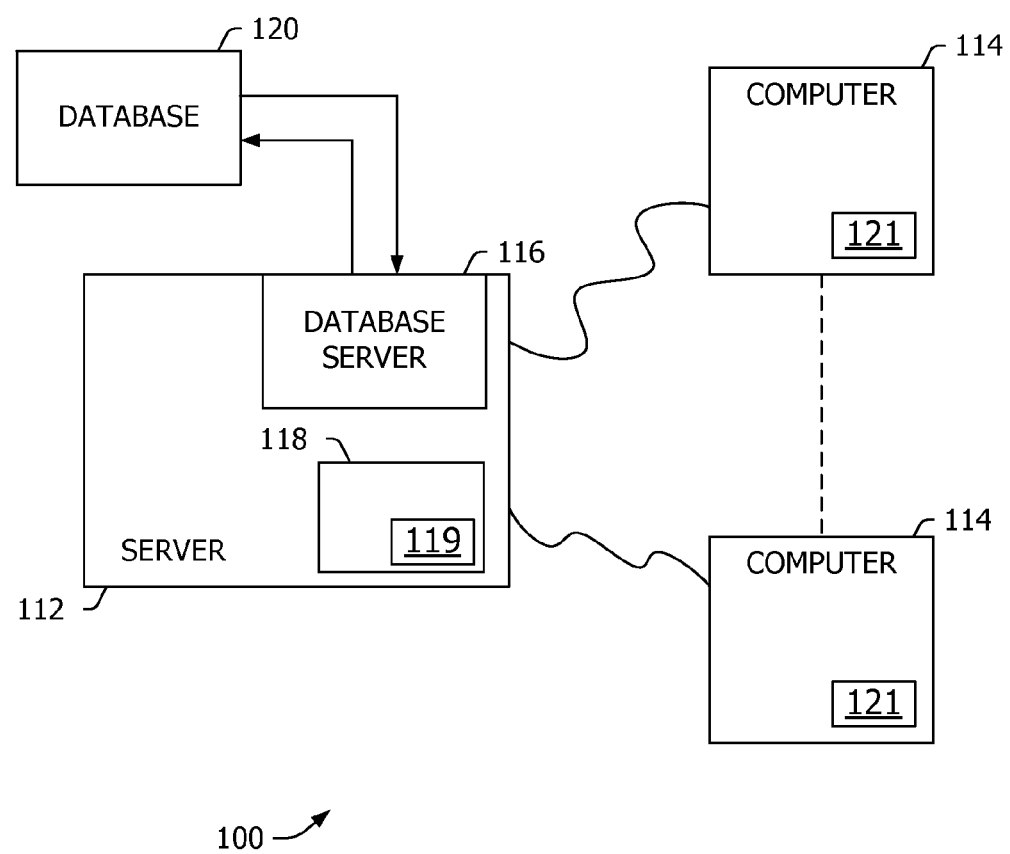

FIG. 2 is a simplified block diagram of an example processing system 100 that includes a plurality of computer devices including one or more user devices having a dispute application in accordance with one embodiment of the present invention. In the example embodiment, system 100 is a payment account card system, which can be utilized by account holders as part of a process of initiating an authorization request and performing a transaction. In addition, system 100 is a payment processing system that includes a transaction lifecycle (TL) computer system 118 configured to generate a transaction lifecycle output and provide the lifecycle and related transaction details via a dispute processing platform 119 to a computing device using a dispute application 121 stored thereon.

More specifically, in the example embodiment, system 100 includes a server system 112, which is a type of computer system, and a plurality of client sub-systems (also referred to as client systems 114) connected to server system 112. In one embodiment, client systems 114 are computers with point-of-sale terminals including a web browser, such that server system 112 is accessible to client systems 114 using the Internet. In one embodiment, client systems 114 is an input device, which is configured to communicate with server system 112, and is associated with or controlled by a cardholder making a purchase using a payment account card and payment account card system 100.

Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment.

A database server 116 is connected to a data warehouse 120, which contains information on a variety of matters, as described below in greater detail. Although database server 116 is shown as part of server system 112, database server 116 could be separate from server system 112 and could be a part of data warehouse 120. In one embodiment, centralized data warehouse 120 is stored on server system 112 and can be accessed by issuers or merchants at one of client systems 114 by logging onto server system 112 through one of client systems 114. In an alternative embodiment, data warehouse 120 is stored remotely from server system 112 and may be non-centralized.

In system 100, transaction data can be communicated from clients systems 114 to server system 112 and stored in data warehouse 120 via database server 116. Data warehouse 120 may store transaction data generated as part of sales activities conducted over the bankcard network 28 including data relating to merchants 24, account holders or customers 22, and purchases. Data warehouse 120 may also store the bank network reference number, authorization code, and/or other transaction identifiers that may be associated with each transaction. Data warehouse 120 may also store account data including at least one of a cardholder name, a cardholder address, an account number, and other account identifier.

Data warehouse 120 may also store merchant data including a merchant identifier that identifies each merchant registered to use the payment account card network, and instructions for settling transactions including merchant bank account information. In one embodiment, dispute processing platform 119 is in communication with both data warehouse 120 and server system 112, which can be accessed by issuers or merchants at one of client systems 114 by logging onto server system 112 through one of client systems 114. Other embodiments may include any arrangement of computing devices and/or software that would enable the system to perform as described herein.

In the example embodiment, one of client systems 114 may be associated with acquirer 26 while another one of client systems 114 may be associated with an issuer 30, yet another client system 114 may be associated with merchant 24, and server system 112 may be associated with payment card system interchange network 28.

Figure 3:
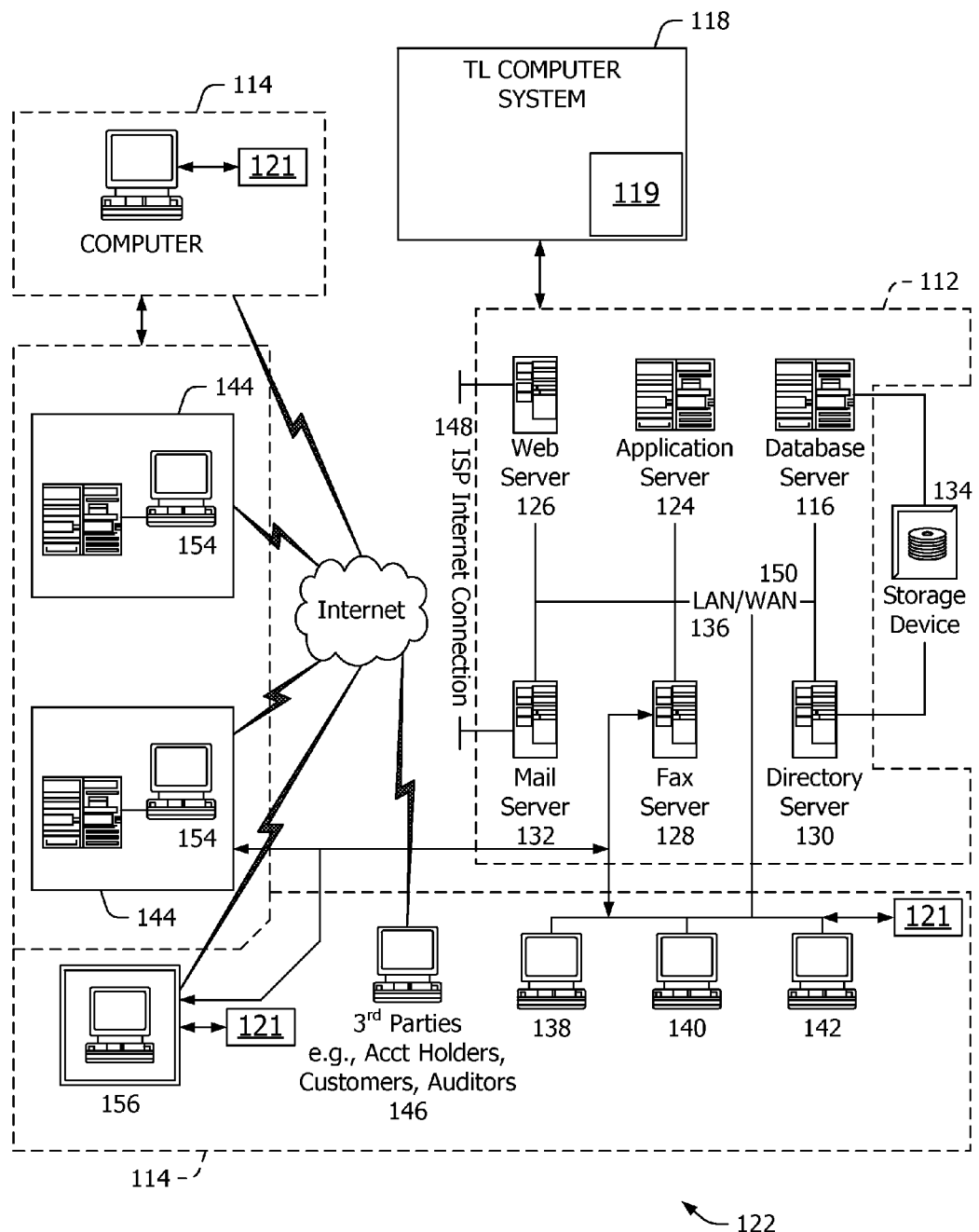

FIG. 3 is an expanded block diagram of an example embodiment of a server architecture of a payment account card system 122 having a transaction lifecycle (TL) computer system 118 including a dispute processing platform 119 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Client systems 114 include dispute application 121. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator workstation 138, a cardholder workstation 140, and a supervisor workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
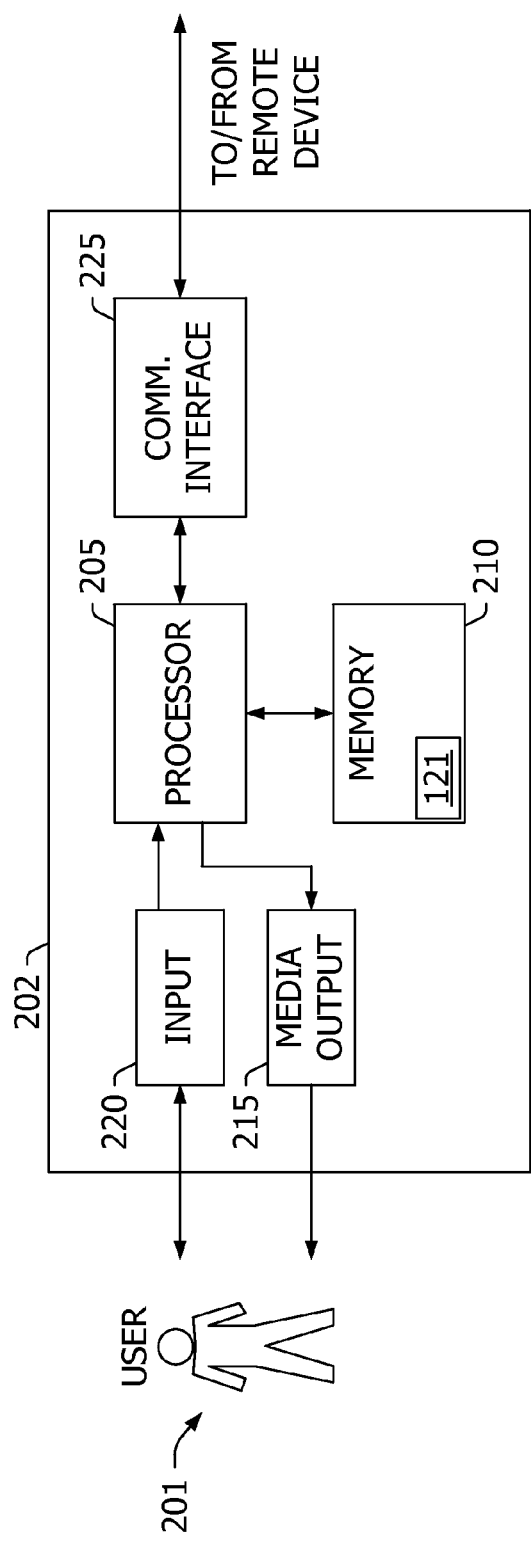

FIG. 4 illustrates an example configuration of a user computer device 202 of a client system as shown in FIGS. 2 and 3. User computer device 202 may include, but is not limited to, client systems 114, 138, 140, and 142, workstation 154, and manager workstation 156 (shown in FIG. 3). In the example embodiment, user computer device 202 is associated with an issuer and/or acquirer.

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media. In the example embodiment, memory area 210 includes dispute application 121 (shown in FIGS. 2 and 3).

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
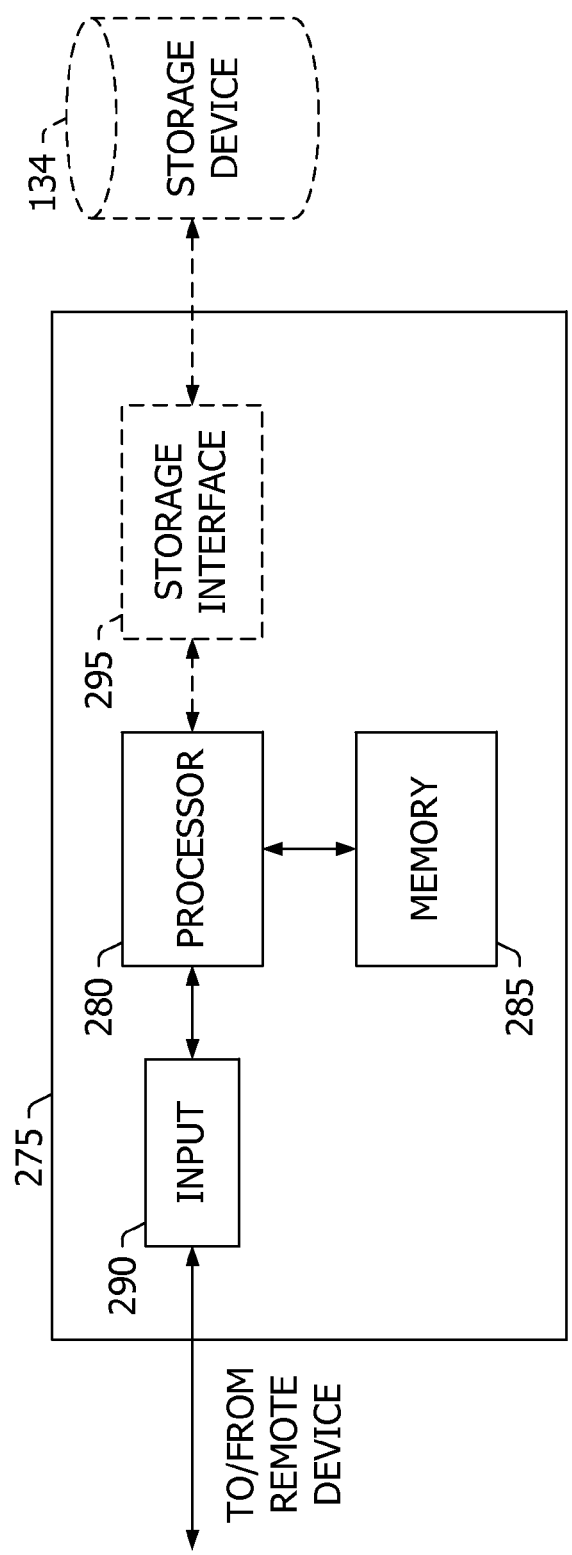

FIG. 5 illustrates an example configuration of a server computer device 275 of server system 112 as shown in FIGS. 2 and 3. Server computer device 275 may include, but is not limited to, database server 116, transaction server 124, web server 126, fax server 128, directory server 130, and mail server 132.

Server computer device 275 includes a processor 280 for executing instructions. Instructions may be stored in a memory area 285, for example. Processor 280 may include one or more processing units (e.g., in a multi-core configuration).

Processor 280 is operatively coupled to a communication interface 290 such that server computer device 275 is capable of communicating with a remote device such as cardholder computer device 202 or another server computer device 275. For example, communication interface 290 may receive requests from client systems 114 via the Internet, as illustrated in FIGS. 2 and 3.

Processor 280 may also be operatively coupled to a storage device 134. Storage device 134 is any computer-operated hardware suitable for storing and/or retrieving data. In some embodiments, storage device 134 is integrated in server computer device 275. For example, server computer device 275 may include one or more hard disk drives as storage device 134. In other embodiments, storage device 134 is external to server computer device 275 and may be accessed by a plurality of server computer devices 275. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 280 is operatively coupled to storage device 134 via a storage interface 295. Storage interface 295 is any component capable of providing processor 280 with access to storage device 134. Storage interface 295 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 280 with access to storage device 134.

Memory areas 210 and 285 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
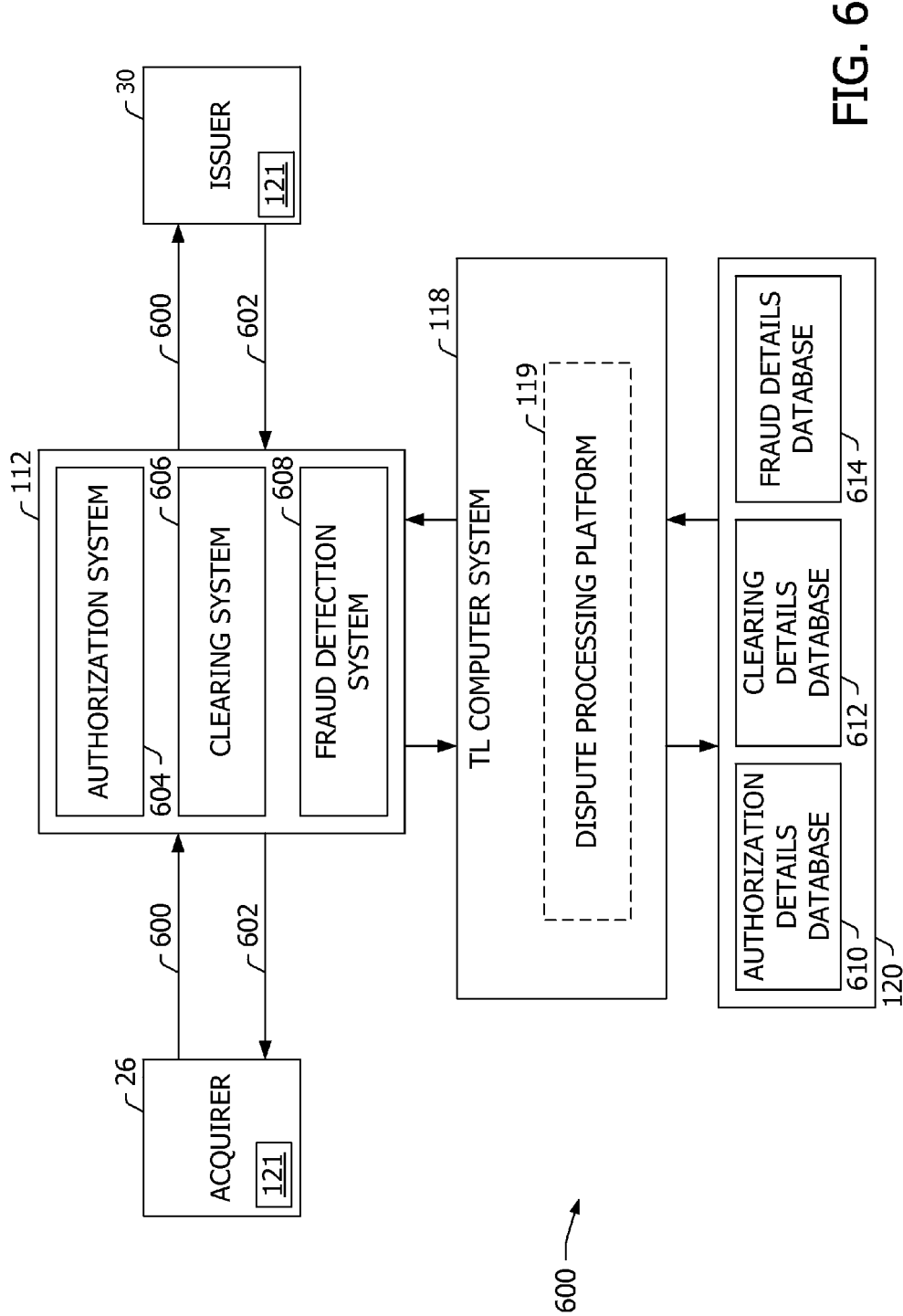

FIG. 6 is a data flow diagram showing a disputed transaction being processed by TL computer system 118 (shown in FIG. 2). In the example embodiment, TL computer system 118 is stored on or in communication with server system 112 and is in communication with data warehouse 120. Components in TL system 118, identical to components of system 100, are identified in FIG. 6 using the same reference numerals as used in FIG. 2.

System 118 stores and retrieves all the data created from each transaction such that a lifecycle of each transaction may be created. During the initial steps of a transaction, merchant 24 sends a request message 600 through acquirer 26 and payment network 28 and its server system 112 to issuer 30. Request message 600 contains all information relevant to the transaction such as the cardholder name, account number, expiration date, billing address, amount of sale, and/or any other data that may be used to identify a transaction. Upon receipt of request message 600, issuer 30 confirms the information sent by merchant 24 and verifies that the cardholder's account has the required credit or deposited amount and sends a response message 602 back to merchant 24 through payment network 28 and acquirer 26 that will indicate whether the transaction is authorized. Issuers worldwide are required to assign a 6-digit authorization code to each transaction as one method of identifying each transaction. For transactions occurring within the United States, issuer 30 includes at least a bank network reference number, such as the Banknet Reference Number used by MasterCard International Incorporated®, for the same purpose of identifying each transaction. Request 600 and response 602 messages containing these bank network reference and authorization numbers are part of the clearing process as previously described.

Server system 112 contains at least an authorization system 604, a clearing system 606, and a fraud detection system 608, while dispute processing platform 119 is in communication with both server system 112 and data warehouse 120. Authorization 604 and clearing 606 systems copy the transaction data that they extract from request 600 and response 602 messages and store the information in separate databases located within data warehouse 120. Authorization data is stored in an authorization details database 610 within data warehouse 120. Authorization data includes a transaction identifier for each authorized transaction. Clearing data is stored in a clearing details database 612, also within data warehouse 120. Clearing data includes a transaction identifier for each cleared transaction.

Also during the transaction process, fraud detection system 608 uses the data in request 600 and response 602 messages, such as amount of sale, geographic location of the sale, and/or any other data that may be used to identify the transaction to assign a fraud score to the transaction. The fraud data includes a transaction identifier for each scored transaction. The scored transaction is sent to the issuer to authorize or decline based on the fraud score. Additionally or alternatively, the issuer may contact the cardholder for authorization. When an issuer declines a transaction or a cardholder reports fraudulent activity, the issuer then reports such information to fraud detection system 608. Fraud detection system 608 flags the transaction as fraudulent and stores the transaction data as a batch file that is sent in a daily feed to a fraud details database 614 in data warehouse 120. When fraud detection system 608 flags a transaction as fraudulent, based either on fraud reports from the issuer or the computed fraud score, it stores the fraudulent transaction data, including an acquirer-assigned sequence number and/or any other data that may be used to identify a transaction in fraud details database 614 as transaction identifiers. Clearing system 606 has previously stored the same transaction data as transaction identifiers, including the acquirer-assigned sequence number in database 612.

In some instances, cardholder 22 later disputes the transaction. A dispute may occur for technical reasons such as insufficient funds, for clerical reasons such as duplicate billing and/or incorrect amount billed, for quality reasons such as when a consumer claims to have never received the goods as promised, and/or for fraud reasons where a cardholder did not authorize the purchase. A dispute may be in the form of either a retrieval request or a chargeback transaction.

A retrieval request is a transaction stage where cardholder 22 observes unrecognized charges on a statement. Cardholder 22 initiates a retrieval request to issuer 30 to obtain proof or documentation relating to the transaction. Issuer 30 requests proof or documentation from acquirer 26 through payment network 28. Upon receipt, issuer 30 provides the documentation to cardholder 22. If cardholder 22 is satisfied with the documentation, no further action is taken. However, if cardholder 22 does not agree with the charge, cardholder 22 may initiate a chargeback of funds. When a retrieval request occurs, retrieval data is stored in data warehouse 120. Retrieval data includes at least one of an acquirer identifier, an issuer identifier, an acquirer reference number, a transaction clearing date, and/or a message reason code.

To initiate a chargeback, cardholder 22 contacts issuer 30 and disputes the transaction. Issuer 30 submits the chargeback transaction to payment network 28, which provides clearing and settlement services to its members. Payment network 28 submits the chargeback to acquirer 26. Acquirer 26 either resolves the dispute or forwards it to merchant 24. Merchant 24 either accepts the chargeback or re-presents it back to acquirer 26. When a chargeback occurs, chargeback data is stored in data warehouse 120 and includes at least one of an acquirer identifier, an issuer identifier, an original transaction amount, a chargeback amount, a chargeback date, an acquirer reference number, a chargeback identifier, and/or a chargeback reason code.

If merchant 24 accepts the chargeback, acquirer 26 forwards the response back to payment network 28. Payment network 28 then settles the chargeback with issuer 30. If merchant 24 re-presents the chargeback, acquirer 26 rejects the chargeback requested by issuer 30, which is a stage referred to as second presentment. During second presentment, acquirer 26 may provide additional proof or documentation that the disputed transaction was valid. When a second presentment occurs, second presentment data is stored in data warehouse 120 and includes at least one of an acquirer identifier, an issuer identifier, a transaction amount, a transaction currency code, an acquirer reference number, a transaction clearing date, a reversal indicator, and or an exclusion indicator. Issuer 30 may either accept the second presentment and take no further action or reject it.

When issuer 30 rejects the second presentment and represents a third time, this is a stage known as arbitration chargeback. Once arbitration chargeback occurs, neither issuer 30 nor acquirer 26 may initiate any additional chargebacks or presentments. At this point, a case filing is automatically generated with payment network 28. When presented with a case filing, payment network 28 reviews the disputed transaction and issues a financial liability decision regarding the chargeback. When a case filing occurs, case filing data is stored in the data warehouse. Case filing data includes a case identifier, a case type, an analyst assigned to the case, a chargeback reason code, and a case status.

In the example embodiment, dispute processing platform 119 is in communication with server system 112, which enables dispute processing platform 119 to communicate with each of acquirer 26, issuer 30, and data warehouse 120. In the example embodiment, dispute processing platform 119 aids in dispute resolution between acquirer 26 and issuer 30 by aggregating all of the transaction data for a transaction available from the various databases 610, 612, and 614 stored in data warehouse 120. Dispute processing platform 119 generates a lifecycle for a disputed transaction, including the transaction data associated with each completed stage of the transaction. Dispute processing platform 119 displays the completed stages of the disputed transaction in the form of a timeline to acquirer 26 and/or issuer 30. Additionally, dispute processing platform 119 provides a summary and a detailed version of the transaction details for each stage, as well as any records or documentation associated with each particular stage. Because all of the completed stages for the transaction are provided in detail by dispute processing platform 119, the time and costs for acquirers 26 and issuers 30 to individually contact each of the various databases and make multiple requests for information are significantly decreased.

Figure 7:
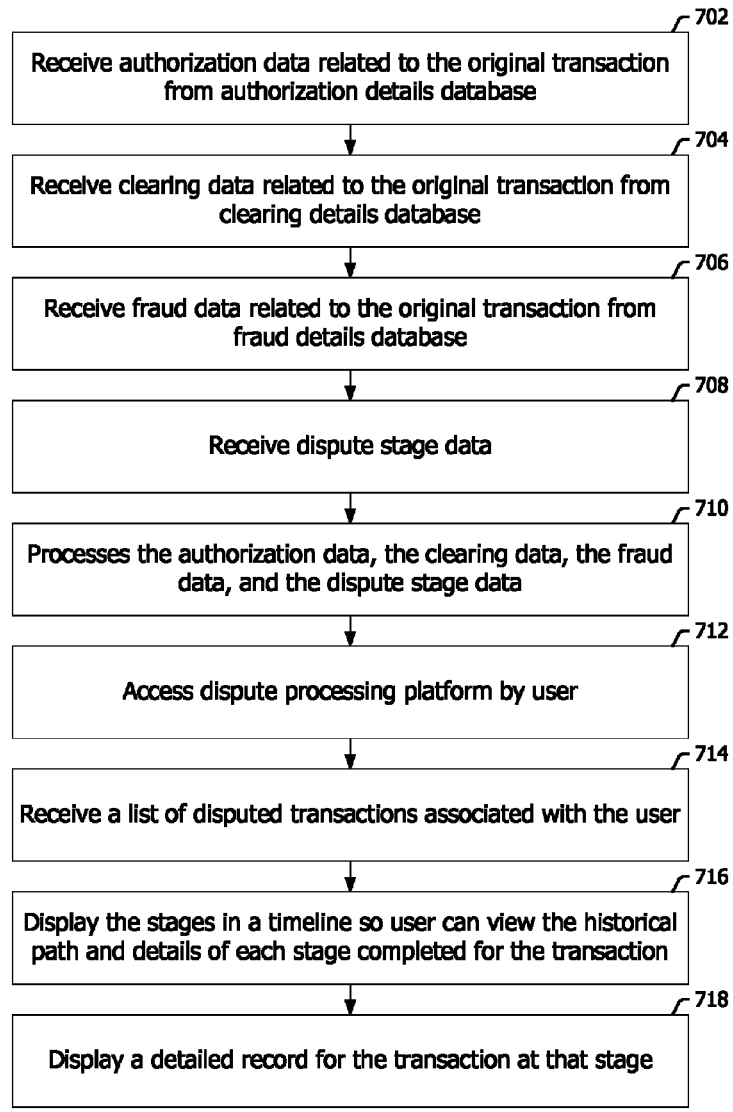

FIG. 7 is a flow chart of an example method of generating a transaction lifecycle output using TL computer system 118 (shown in FIG. 2). In the example embodiment, TL computer system 118 generates a lifecycle of completed stages of a transaction and enables a user to view details of each stage over the lifecycle of the transaction. More specifically, in the example embodiment, TL computer system 118 generates the lifecycle and provides a visual display of the transaction's historical path via dispute processing platform 119 to a user (e.g., an issuer or an acquirer).

For each disputed transaction associated with user 201, dispute processing platform 119 accesses data warehouse 120 (shown in FIG. 2) and receives 702 authorization data related to the original transaction from authorization details database 610 (shown in FIG. 6). The authorization data includes information relevant to the transaction, including cardholder name, account number, expiration date, billing address, amount of sale, and/or any other data that may be used to identify a transaction.

Dispute processing platform 119 then accesses data warehouse 120 and receives 704 clearing data related to the original transaction from clearing details database 612 (shown in FIG. 6). The clearing data includes data relating to the movement of information and exchange of funds that occurred between acquirer 26, interchange network 28, and issuer 30.

Dispute processing platform 119 also accesses data warehouse 120 and receives 706 fraud data related to the original transaction from fraud details database 614 (shown in FIG. 6). The fraud data includes data relating to the fraud score calculated by fraud detection system 608 (shown in FIG. 6) during the original transaction.

Dispute processing platform 119 also accesses data warehouse 120 and receives 708 data associated with completed dispute stages. Dispute stages include retrieval request, first chargeback, second presentment, arbitration chargeback, and case filing.

Based on a disputed transaction selected by the user, dispute processing platform 119 processes 710 the authorization data, the clearing data, the fraud data, and the dispute stage data to determine which lifecycle stages have been completed for the selected transaction.

In the example embodiment, the user accesses 712 dispute processing platform 119 by entering predetermined credentials into a computer device. In the example embodiment, the user is acquirer 26 and/or issuer 30 (shown in FIG. 1). Once access is confirmed, dispute processing platform 119 displays 714 a list of disputed transactions associated with the user. The list may be sorted based on user preference and includes at least a transaction identifier, a primary account number (PAN), and/or a reason code for each disputed transaction.

Dispute processing platform 119 displays 716 the stages in a timeline so that the user can view the historical path and details of each stage completed for the transaction. Lifecycle stages that may be displayed include, but are not limited to, authorization, settlement, retrieval request, chargeback, second presentment, arbitration chargeback, and case filing.

The user may select any completed lifecycle stage, and in response, dispute processing platform 119 displays 718 a detailed record for the transaction at that stage. Within the detailed record, dispute processing platform 119 displays any authorization data, clearing data, fraud data, detailed stage data, and copies of any documents or records recorded during the stage.

Dispute processing platform 119 enables users, such as issuers and acquirers, to obtain detailed historical information for a completed transaction during dispute processing. Because the user receives the entire transaction lifecycle output via one interface, the time and costs associated with dispute resolution are reduced.

FIG. 8 is a screenshot of an example home screen 800 generated by TL computer system 118 (shown in FIGS. 2 and 3) and displayed on client system 114 (shown in FIGS. 2 and 3) when an issuer and/or an acquirer accesses it. In the example embodiment, when a user logs in to dispute processing platform 119, a disputed transaction list 802 is displayed. Disputed transaction list 802 includes a transaction identifier column 804, a PAN column 806, a reason code column 808, and an acquirer reference data column 810. The user may selectively sort disputed transaction list 802 based on any column.

The user selects a specific transaction and dispute processing platform 119 displays the lifecycle and details for the transaction in a transaction detail window 812. In the example embodiment, transaction detail window 812 includes a lifecycle timeline 814 and a transaction summary list 816 for the transaction. In the example embodiment, transaction summary list 816 includes transaction details including, but not limited to, a chargeback identifier, chargeback amount, currency code, account number, acquirer reference data, chargeback reference number, reason code, cycle, chargeback date, and/or clearing date. The user may view specific details for a particular stage by selecting the stage on lifecycle timeline 814.

In the example embodiment, lifecycle timeline 814 includes each lifecycle stage completed for the transaction. Lifecycle stages that may be displayed include, but are not limited to, authorization, 1st presentment, retrieval request, chargeback, second presentment, arbitration chargeback, case filing, arbitration, pre-compliance, and/or compliance. The user may view the entire lifecycle of a disputed transaction, including related documentation, on one computer system.

Figure 9:
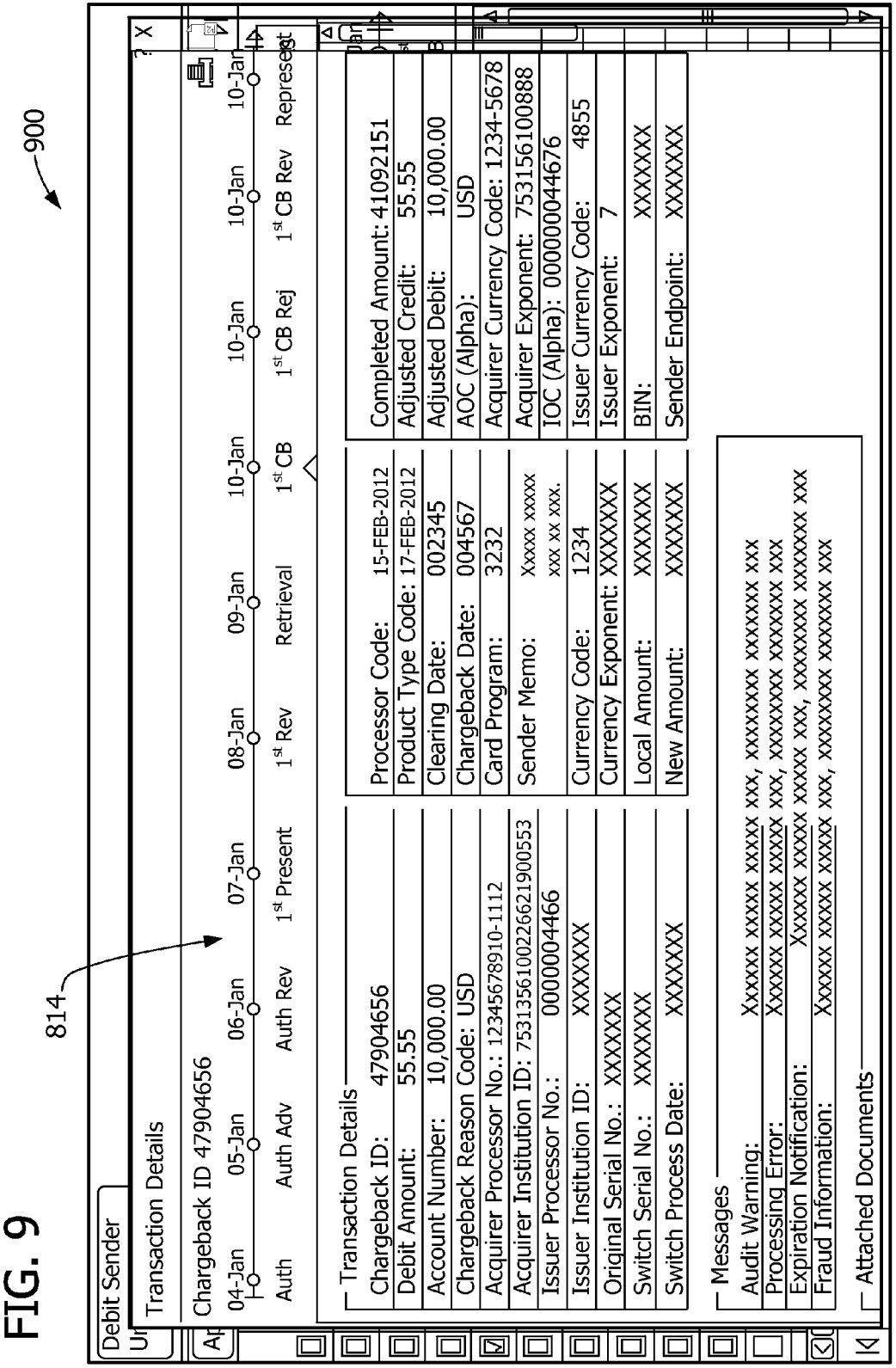

FIG. 9 is a screenshot of an exemplary stage detail window 900 generated by TL computer system 118 (shown in FIGS. 2 and 3). When the user selects a stage on lifecycle timeline 814 (shown in FIG. 8), stage detail window 900 overlays disputed transaction list 802 (shown in FIG. 8) to display details for the selected stage. In the example embodiment, details for a chargeback stage are displayed. For the chargeback stage, stage detail window 900 displays an acquirer identifier, an issuer identifier, an original transaction amount, a chargeback amount, a chargeback date, an acquirer reference number, a chargeback identifier, and/or a chargeback reason code. The user may scroll down in stage detail window 900 to view any attached documents related to the chargeback. From stage detail window 900, the user may select another stage for the transaction from lifecycle timeline 814, which is also displayed in stage detail window 900, or the user may close the pop up window and return to disputed transaction list 802.

For the authorization stage, in the example embodiment, stage detail window 900 displays at least one of an acquirer identifier, an issuer identifier, a transaction amount, a transaction currency code, an acquirer reference number, and/or a transaction date.

For the retrieval request stage, in the example embodiment, stage detail window 900 displays at least one of an acquirer identifier, an issuer identifier, an acquirer reference number, a transaction clearing date, and/or a message reason code.

For the first and second presentment stages, in the example embodiment, stage detail window 900 displays at least one of an acquirer identifier, an issuer identifier, a transaction amount, a transaction currency code, an acquirer reference number, a transaction clearing date, a reversal indicator, and or an exclusion indicator.

For the case filing stage, in the example embodiment, stage detail window 900 displays at least one of a case identifier, a case type, an analyst assigned to the case, a chargeback reason code, and a case status.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications or code) include machine instructions for a programmable processor, and can be implemented in a high-level procedural and/or object-oriented programming language, and/or in assembly/machine language. As used herein, the terms "machine-readable storage medium" and "computer-readable storage medium" refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term "machine-readable signal" refers to any signal used to provide machine instructions and/or data to a programmable processor. The machine-readable storage medium and computer-readable medium do not include transitory signals.

The above-described methods and systems for generating a transaction lifecycle output for a payment card transaction enable a user disputing a financial transaction on behalf of a cardholder and/or merchant to view the lifecycle for the transaction including each stage completed for the transaction. Additionally, the methods and systems described herein retrieve transaction data for a disputed transaction from a plurality of different databases and display the transaction data in a timeline for the user to view. Specifically, the above-described embodiments enable the user to access data associated with a disputed transaction on one convenient platform, providing a time and cost-saving option for users during a disputed transaction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transaction lifecycle (TL) computer system for generating a transaction lifecycle output for each of a plurality of disputed payment card transactions initiated over a payment network, each of the disputed payment card transactions associated with a respective payment card, each payment card issued by an issuer to a cardholder, said TL computer system comprising:
    a memory device for storing data; and
    a processor in communication with said memory device, said processor programmed to:
    receive transaction data associated with the payment card transactions being processed over the payment network, the transaction data including transaction authorization data stored in a first database, transaction clearing data stored in a second database, and transaction fraud data stored in a third database;
    electronically link for each transaction the transaction authorization data, the transaction clearing data, and the transaction fraud data, which are received from the first, second, and third databases, respectively;
    receive a dispute signal for one or more of the transactions, wherein each dispute signal is associated with one of a plurality of pre-defined dispute stages in a dispute processing of a disputed payment card transaction including at least one of retrieval request, chargeback, second presentment, arbitration chargeback, case filing, arbitration, pre-compliance, and compliance;
    generate the transaction lifecycle output by processing the transaction authorization data, the transaction clearing data, the transaction fraud data, and data associated with each of the plurality of pre-defined dispute stages associated with each disputed payment card transaction, the transaction lifecycle output including a respective detailed record for each transaction processing stage having been completed from among a plurality of pre-defined transaction processing stages for each disputed payment card transaction, wherein the plurality of pre-defined transaction processing stages includes authorization, first presentment, and the plurality of pre-defined dispute stages; and
    cause the transaction lifecycle output to be displayed on a graphical user interface on a user device, wherein the graphical user interface is generated by said processor and includes:
        a first display area that includes a first portion and a second portion, the first portion including an interactive list of the disputed payment card transactions, the second portion including a single electronic interactive timeline that comprises selectable graphic representations for each of the completed transaction processing stages of one of the disputed transactions having been selected by a user from the interactive list, the selectable graphic representations being displayed in chronological order, and each of the selectable graphic representations being electronically linked to a corresponding detailed record associated with a corresponding completed transaction processing stage for the user-selected disputed transaction; and
        a second display area that at least partially overwrites the first display area in response to selection by the user of one of the selectable graphic representations in the second portion of the first display area, the second display area including the detailed record associated with the corresponding completed transaction processing stage for the one of the disputed transactions selected by the user from the interactive list, wherein the detailed record includes an image of a previously recorded document associated with the selected corresponding completed transaction processing stage.

2. A system in accordance with claim 1, wherein said processor is further programmed to receive dispute stage data associated with the dispute signal, the dispute stage data including at least one of retrieval data, chargeback data, second presentment data, case filing data, arbitration chargeback data, arbitration data, pre-compliance data, and compliance data.

3. A system in accordance with claim 1, wherein said processor is further programmed to receive at least one of:
    the transaction authorization data including a transaction amount and a transaction date;
    the transaction clearing data including at least one of an issuer identifier, an acquirer identifier, and a settlement date; and
    the transaction fraud data including a fraud score based on at least one of an amount of the payment card transaction and a geographic location corresponding to the payment card transaction.

4. A system in accordance with claim 1, wherein the dispute signal comprises at least one of a retrieval request by the cardholder requesting more data about the disputed transaction and a chargeback request by the cardholder requesting a chargeback of the disputed transaction.

5. A computer-implemented method of generating a transaction lifecycle output for each of a plurality of disputed payment card transactions initiated over a payment network, each of the disputed payment card transactions associated with a respective payment card, each payment card issued by an issuer to a cardholder, the transaction lifecycle output generated using a transaction lifecycle (TL) computer system including a processor in communication a memory device, said method comprising:
    receiving, by the TL computer system, transaction data associated with the payment card transactions processed over the payment network, the transaction data including transaction authorization data stored in a first database, transaction clearing data stored in a second database, and transaction fraud data stored in a third database;

electronically linking for each transaction the transaction authorization data, the transaction clearing data, and the transaction fraud data, which are received from the first, second, and third databases, respectively;

receiving a dispute signal for one or more of the transactions, wherein each dispute signal is associated with one of a plurality of pre-defined dispute stages in a dispute processing of a disputed payment card transaction including at least one of retrieval request, chargeback, second presentment, arbitration chargeback, case filing, arbitration, pre-compliance, and compliance;

generating, by the TL computer system, the transaction lifecycle output by processing the transaction authorization data, the transaction clearing data, the transaction fraud data, and data associated with each of the plurality of pre-defined dispute stages associated with each disputed payment card transaction, the transaction lifecycle output including a respective detailed record for each transaction processing stage having been completed from among a plurality of pre-defined transaction processing stages for each disputed payment card transaction, wherein the plurality of pre-defined transaction processing stages includes authorization, first presentment, and the plurality of pre-defined dispute stages; and causing the transaction lifecycle output to be displayed on a graphical user interface on a user device, wherein the graphical user interface is generated by the TL computer system and includes:

a first display area that includes a first portion and a second portion, the first portion including an interactive list of the disputed payment card transactions, the second portion including a single electronic interactive timeline that comprises selectable graphic representations for each of the completed transaction processing stages of one of the disputed transactions having been selected by a user from the interactive list, the selectable graphic representations being displayed in chronological order, and each of the selectable graphic representations being electronically linked to a corresponding detailed record associated with a corresponding completed transaction processing stage for the user-selected disputed transaction; and a second display area that at least partially overwrites the first display area in response to selection by the user of one of the selectable graphic representations in the second portion of the first display area, the second display area including the detailed record associated with the corresponding completed transaction processing stage for the one of the disputed transactions selected by the user from the interactive list, wherein the detailed record includes an image of a previously recorded document associated with the selected corresponding completed transaction processing stage.

6. A computer-implemented method in accordance with claim 5, further comprising receiving dispute stage data associated with the dispute signal, the dispute stage data including at least one of retrieval data, chargeback data, second presentment data, case filing data, arbitration chargeback data, arbitration data, pre-compliance data, and compliance data.

7. A computer-implemented method in accordance with claim 5, further comprising at least one of:

receiving the transaction authorization data including a transaction amount and a transaction date;

receiving the transaction clearing data including at least one of an issuer identifier, an acquirer identifier, and a settlement date; and receiving the transaction fraud data including a fraud score based on at least one of an amount of the payment card transaction and a geographic location corresponding to the payment card transaction.

8. One or more non-transitory computer-readable storage media having computer-executable instructions embodied thereon, wherein, when executed by at least one processor on a transaction lifecycle (TL) computer system, the computer-executable instructions cause the at least one processor to:

receive transaction data associated with a plurality of payment card transactions processed over a payment network, the transaction data including transaction authorization data stored in a first database, transaction clearing data stored in a second database, and transaction fraud data stored in a third database, the payment card transaction associated with a payment card issued by an issuer to a cardholder;

electronically link for each transaction the transaction authorization data, the transaction clearing data, and the transaction fraud data, which are received from the first, second, and third databases, respectively;

receive a dispute signal for one or more of the transactions, wherein each dispute signal is associated with one of a plurality of pre-defined dispute stages in a dispute processing of a disputed payment card transaction including at least one of retrieval request, chargeback, second presentment, arbitration chargeback, case filing, arbitration, pre-compliance, and compliance;

generate a transaction lifecycle output by processing the transaction authorization data, the transaction clearing data, the transaction fraud data, and data associated with each of the plurality of pre-defined dispute stages associated with each disputed payment card transaction, the transaction lifecycle output including a respective detailed record for each transaction processing stage having been completed from among a plurality of pre-defined transaction processing stages for each disputed payment card transaction, wherein the plurality of pre-defined transaction processing stages includes authorization, first presentment, and the plurality of pre-defined dispute stages; and cause the transaction lifecycle output to be displayed on a graphical user interface on a user device, wherein the graphical user interface is generated by the at least one processor and includes:

a first display area that includes a first portion and a second portion, the first portion including an interactive list of the disputed payment card transactions, the second portion including a single electronic interactive timeline that comprises selectable graphic representations for each of the completed transaction processing stages of one of the disputed transactions having been selected by a user from the interactive list, the selectable graphic representations being displayed in chronological order, and each of the selectable graphic representations being electronically linked to a corresponding detailed record associated with a corresponding completed transaction processing stage for the user-selected disputed transaction; and a second display area that at least partially overwrites the first display area in response to selection by the user of one of the selectable graphic representations in the second portion of the first display area, the second display area including the detailed record associated with the corresponding completed transaction processing stage for the one of the disputed transactions selected by the user from the interactive list, wherein the detailed record includes an image of a previously recorded document associated with the selected corresponding completed transaction processing stage.

9. The computer-readable storage media in accordance with claim 8, wherein the computer-executable instructions further cause the processor to receive dispute stage data associated with the dispute signal, the dispute stage data including at least one of retrieval data, chargeback data, second presentment data, case filing data, arbitration chargeback data, arbitration data, pre-compliance data, and compliance data.

* * * * *

UNITED STATES PATENT AND TRADEMARK OFFICE
CERTIFICATE OF CORRECTION

| | | |
|---|---|---|
| PATENT NO. | : 9,916,585 B2 | Page 1 of 1 |
| APPLICATION NO. | : 13/796795 | |
| DATED | : March 13, 2018 | |
| INVENTOR(S) | : Larko et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this
First Day of May, 2018

Andrei Iancu
*Director of the United States Patent and Trademark Office*